United States Patent
Park et al.

(10) Patent No.: US 10,474,209 B2
(45) Date of Patent: Nov. 12, 2019

(54) INTEGRATED CIRCUIT FOR IMPLEMENTING A COOLING ALGORITHM AND A MOBILE DEVICE INCLUDING THE SAME

(71) Applicant: Samsung Electronics Co., Ltd., Suwon-si, Gyeonggi-do (KR)

(72) Inventors: Jong Lae Park, Anyang-si (KR); Seung Kyu Kim, Sejong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 129 days.

(21) Appl. No.: 15/341,314

(22) Filed: Nov. 2, 2016

(65) Prior Publication Data
US 2017/0147048 A1 May 25, 2017

(30) Foreign Application Priority Data
Nov. 20, 2015 (KR) .................. 10-2015-0163128

(51) Int. Cl.
*G06F 1/20* (2006.01)
*G06F 1/32* (2019.01)
*G06F 1/324* (2019.01)

(52) U.S. Cl.
CPC .............. *G06F 1/206* (2013.01); *G06F 1/324* (2013.01); *Y02D 10/126* (2018.01); *Y02D 10/16* (2018.01)

(58) Field of Classification Search
None
See application file for complete search history.

(56) References Cited

U.S. PATENT DOCUMENTS

| | | | |
|---|---|---|---|
| 6,901,524 B2 | 5/2005 | Watts, Jr. | |
| 7,353,133 B2 | 4/2008 | Park | |
| 7,475,320 B2 | 1/2009 | Knebel et al. | |
| 7,520,669 B2 | 4/2009 | Yazawa et al. | |
| 7,542,445 B2 | 6/2009 | Berggren | |
| 7,831,842 B2 | 11/2010 | Adachi et al. | |
| 8,320,898 B2 | 11/2012 | Salsbery et al. | |
| 8,847,669 B2 | 9/2014 | Park et al. | |
| 2010/0314094 A1 | 12/2010 | Hall | |
| 2012/0079290 A1* | 3/2012 | Kumar ................ | G06F 1/26 713/300 |

(Continued)

FOREIGN PATENT DOCUMENTS

KR 101538230 B1 7/2015

*Primary Examiner* — Jaweed A Abbaszadeh
*Assistant Examiner* — Cheri L Harrington
(74) *Attorney, Agent, or Firm* — Harness, Dickey & Pierce, P.L.C.

(57) ABSTRACT

In one example embodiment, an integrated circuit includes a memory configured to store a first table listing a plurality of clip frequencies respectively corresponding to a plurality of reference temperatures, and a second table listing one or more of the plurality of clip frequencies and a plurality of timestamps each respectively corresponding to the one or more of the plurality of clip frequencies. The integrated circuit further includes a cooling frequency adjustor configured to select one of the plurality of clip frequencies stored in the first table as a first clip frequency, and store a current timestamp of the first clip frequency in the second table. The integrated circuit further includes a central processing unit (CPU) configured to control an operation of the cooling frequency adjustor.

18 Claims, 11 Drawing Sheets

(56) References Cited

U.S. PATENT DOCUMENTS

| | | |
|---|---|---|
| 2012/0215373 A1 | 8/2012 | Koblenz et al. |
| 2013/0097443 A1* | 4/2013 | Li .................... G06F 1/3206 |
| | | 713/322 |
| 2013/0111226 A1* | 5/2013 | Ananthakrishnan ...... G06F 1/26 |
| | | 713/300 |
| 2013/0120630 A1 | 5/2013 | Kim et al. |
| 2013/0274928 A1 | 10/2013 | Matsuoka et al. |
| 2013/0289812 A1 | 10/2013 | Anzicek |
| 2014/0023339 A1* | 1/2014 | Takahashi .......... H04N 1/00832 |
| | | 386/230 |
| 2014/0091624 A1* | 4/2014 | Park .................... G05F 3/08 |
| | | 307/31 |
| 2014/0118931 A1 | 5/2014 | Hata |
| 2014/0257591 A1 | 9/2014 | Cheng et al. |
| 2014/0277769 A1 | 9/2014 | Matsuoka et al. |
| 2014/0305141 A1 | 10/2014 | Anandhakrishnan |
| 2014/0324245 A1 | 10/2014 | Kwon et al. |
| 2015/0134988 A1* | 5/2015 | Wang .................... G06F 1/206 |
| | | 713/322 |
| 2015/0185716 A1 | 7/2015 | Wichmann et al. |
| 2015/0286262 A1* | 10/2015 | Park .................. G05D 23/1917 |
| | | 713/320 |
| 2015/0363212 A1* | 12/2015 | Gupta .................. G06F 9/44505 |
| | | 713/100 |
| 2016/0048181 A1* | 2/2016 | Rosenzweig ........... G06F 1/206 |
| | | 713/322 |
| 2016/0314229 A1* | 10/2016 | Bickford ............ G06F 17/5031 |
| 2016/0327999 A1* | 11/2016 | Chang .................. G06F 1/3296 |

\* cited by examiner

FIG. 3

Temperature and Clip Frequency Table

| Temperature | Clip Frequency |
|---|---|
| TC7 | CFreq7=0 |
| TC6 | CFreq6 |
| TC5 | CFreq5 |
| TC4 | CFreq4 |
| TC3 | CFreq3 |
| TC2 | CFreq2 |
| TC1 | CFreq1 |

~181

Temperature : Tmin, Tave, or Tmax

FIG. 4

Clip Frequency and Timestamp Table

| Clip Frequency | Timestamp |
|---|---|
| CFreq1 | t2 |
| CFreq2 | t1 --update--> t5/t5' |
| CFreq3 | t3 |
| CFreq5 | t4 |

~183

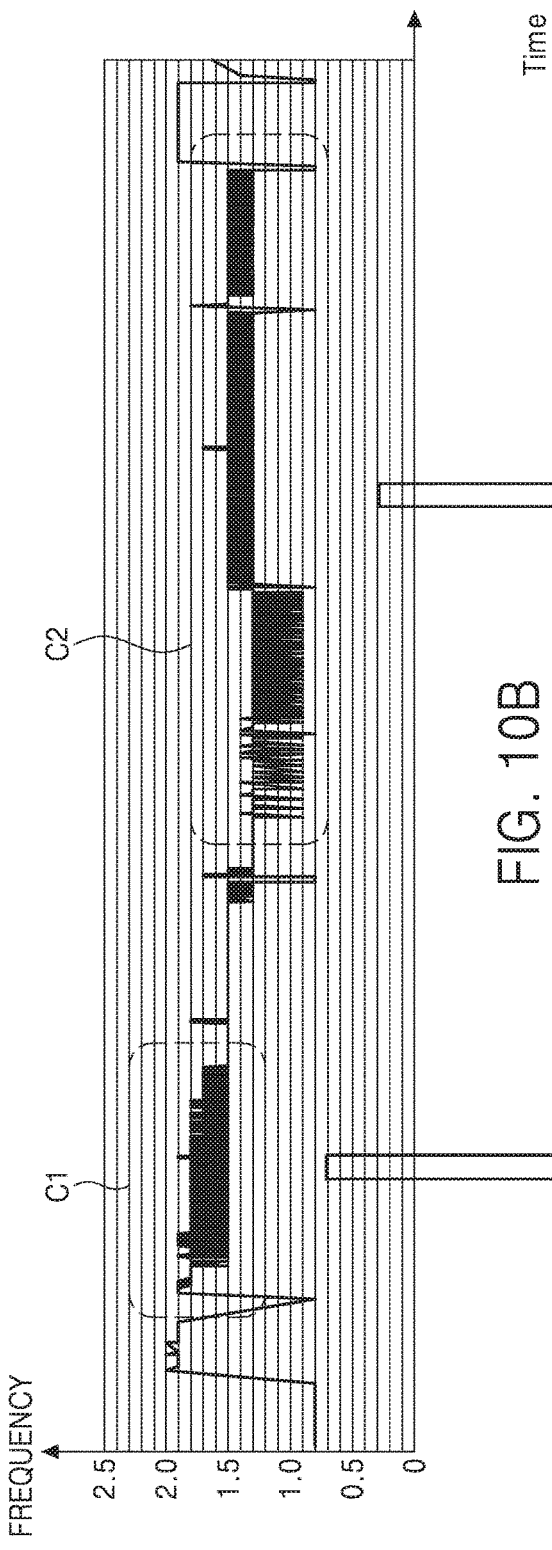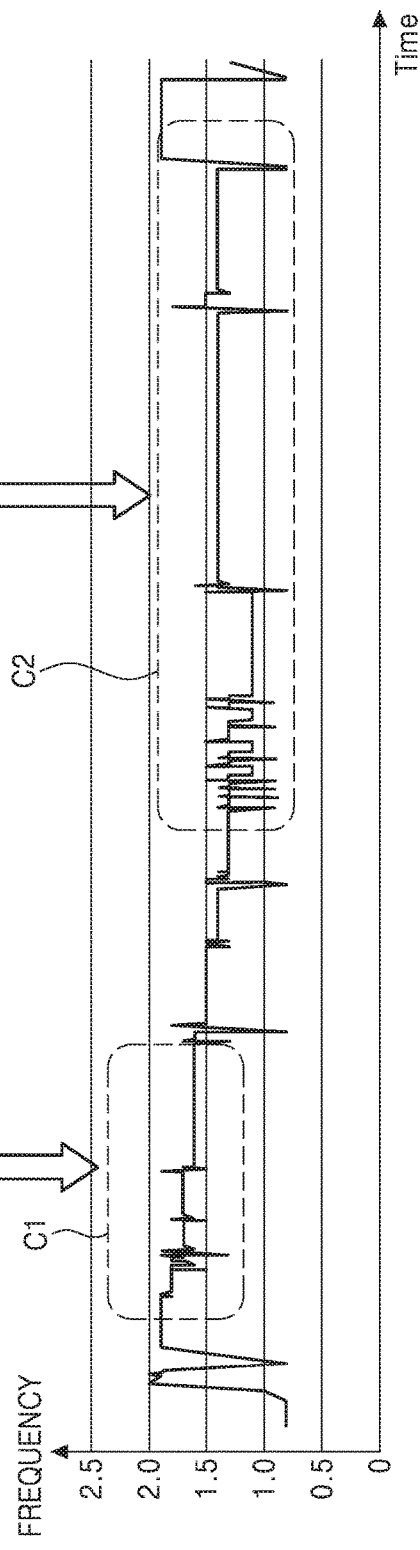

INTEGRATED CIRCUIT FOR IMPLEMENTING A COOLING ALGORITHM AND A MOBILE DEVICE INCLUDING THE SAME

CROSS-REFERENCE TO RELATED APPLICATION

This application claims priority under 35 U.S.C. § 119(a) from Korean Patent Application No. 10-2015-0163128 filed on Nov. 20, 2015, the disclosure of which is hereby incorporated by reference in its entirety.

BACKGROUND

Example embodiments of inventive concepts relate to an integrated circuit for implementing a cooling algorithm, and more particularly, to an integrated circuit for analyzing a clip frequency supply history and implementing a cooling algorithm for power-saving and performance improvement according to the analysis result and to a mobile device including the same.

Mobile devices use an output voltage of a battery as an operating voltage and make a close contact with users. In particular, for mobile devices requiring a large amount of data process, various cooling algorithms are used in order to prevent users from suffering a low-temperature burn and to increase a battery use time. Passive cooling is generally used in mobile devices.

The purpose of a cooling algorithm is to prevent users from suffering a low-temperature burn. Various measures for preventing heat from being generated in a printed circuit board (PCB) of a mobile device are used for this purpose. It is also important to prevent current consumption increasing due to an increase of thermal resistance caused by heating and to prevent the elements of a mobile device from being damaged physically and/or chemically.

In order to overcome said problems, a cooling algorithm is used in a mobile device. Passive cooling rather than active cooling is usually used in a mobile device using a battery due to a limited amount of supplied power. Passive cooling is a method of cooling an electronic device, e.g., a mobile device without consuming additional energy. For the passive cooling, a heat treatment element is installed in a PCB or the operating frequency of a mobile device is decreased. Active cooling is a method of cooling an electronic device, e.g., a mobile device using a cooling fan consuming energy.

A method of decreasing the operating frequency of an electronic device is widely used for passive cooling. When this method is used, the performance of the electronic device is degraded if the operating frequency is decreased. In other words, as an electronic device is cooled down in order to overcome heating problems, the performance of the electronic device may be degraded.

SUMMARY

In one example embodiment, an integrated circuit includes a memory configured to store a first table listing a plurality of clip frequencies respectively corresponding to a plurality of reference temperatures, and a second table listing one or more of the plurality of clip frequencies and a plurality of timestamps each respectively corresponding to the one or more of the plurality of clip frequencies. The integrated circuit further includes a cooling frequency adjustor configured to select one of the plurality of clip frequencies stored in the first table as a first clip frequency, and store a current timestamp of the first clip frequency in the second table. The integrated circuit further includes a central processing unit (CPU) configured to control an operation of the cooling frequency adjustor.

In yet another example embodiment, the integrated circuit further includes a plurality of thermal sensors and a clock management unit, wherein the cooling frequency adjustor is further configured to determine a current temperature based on a plurality of temperatures detected by the plurality of thermal sensors, at least one of select the first clip frequency based on the current temperature, and determine a second clip frequency corresponding to the current temperature using the one or more of the plurality of clip frequencies in the second table. The clock management unit is configured to apply a clock signal having one of the first and second clip frequencies, to the CPU according to a control of the cooling frequency adjustor.

In yet another example embodiment, the cooling frequency adjustor is configured to adjust a previous timestamp of the first clip frequency with a current timestamp of the first clip frequency, the one or more of the plurality of clip frequencies including the first clip frequency, and the plurality of timestamps including the previous timestamp of the first clip frequency.

In yet another example embodiment, the second clip frequency is different from any of the plurality of clip frequencies in the first table.

In yet another example embodiment, the second clip frequency is an average of the one or more of the plurality of clip frequencies in the second table.

In yet another example embodiment, the cooling frequency adjustor is configured to determine whether the first clip frequency is repeated during a reference time, and output a determination result signal to the clock management unit, the clock management unit being configured to apply the clock signal to the CPU based on the determination result signal.

In yet another example embodiment, the cooling frequency adjustor is configured to determine whether the first clip frequency is repeated during a reference time, control the clock management unit to apply the clock signal having the second clip frequency to the CPU when the first clip frequency has been repeated, and control the clock management unit to apply the clock signal having the first clip frequency to the CPU when the first clip frequency has not been repeated.

In yet another example embodiment, the cooling frequency adjustor is configured to determine which one of a plurality of temperature windows an average temperature of the plurality of temperatures belongs to, and determine the current temperature as one of the average temperature of the plurality of temperatures, a maximum temperature of the plurality of temperatures and a minimum temperature of the plurality of temperatures based on a temperature window to which the average temperature belongs.

In yet another example embodiment, the cooling frequency adjustor is configured to detect a change in the current temperature; and increase one of the first and second clip frequencies by a frequency increase step based on the detected change in the current temperature. The clock management unit is configured to apply the clock signal having one of an increased first clip frequency and an increased second clip frequency, to the CPU.

In one example embodiment, an integrated circuit includes a central processing unit (CPU), a cooling frequency adjustor controlled by the CPU and configured to determine whether a first clip frequency corresponding to a current temperature of the integrated circuit has been supplied to the CPU at least once during a reference time, and generate a control signal based on whether the first clip frequency has been applied to the CPU at least once during the reference time. The integrated circuit further includes a clock management unit configured to apply a clock signal having one of the first clip frequency and a second clip frequency, to the CPU in response to the control signal, the second clip frequency being based on a representative temperature corresponding to a first group of clip frequencies that have been supplied to the CPU during the reference time.

In yet another example embodiment, the integrated circuit further includes a memory configured to store a first table including a second group of clip frequencies each having a corresponding reference temperature; and a second table configured to store the first group of clip frequencies among the second group of clip frequencies as well as timestamps respectively corresponding to the first group clip frequencies, the first group of clip frequencies include the first clip frequency.

In yet another example embodiment, the integrated circuit further includes a plurality of thermal sensors, wherein the cooling frequency adjustor is configured to determine the current temperature based on a plurality of temperatures detected by the plurality of thermal sensors, and at least one of select the first clip frequency based on the current temperature, and determine the second clip frequency corresponding to the current temperature using the first group of clip frequencies in the second table.

In yet another example embodiment, generate the control signal for generation of the dock signal having the second clip frequency when the first clip frequency has been supplied to the CPU at least once during the reference time, and generate the control signal for generation of the clock signal having the first clip frequency when the first dip frequency has not been supplied to the CPU during the reference time.

In yet another example embodiment, the cooling frequency adjustor is configured to determine, which one of a plurality of temperature windows an average temperature of the plurality of temperatures belongs to, and determine the current temperature as one of the average temperature, a maximum temperature and a minimum temperature of the plurality of temperatures based on a temperature window to which the average temperature belongs.

In yet another example embodiment, the cooling frequency adjustor is configured to detect a change in the current temperature, and increase one of the first and second clip frequencies by a frequency increase step based on the detected change in the current temperature, the clock management unit being configured to apply the clock signal having one of an increased first clip frequency and an increased second clip frequency, to the CPU.

In one example embodiment, a mobile device includes a system on chip (SoC) and a power management unit configured to supply an operating voltage to the SoC. The SoC includes a central processing unit (CPU) configured to operate using the operating voltage, a cooling frequency adjustor controlled by the CPU and configured to determine whether a first clip frequency corresponding to a current temperature of the SoC has been supplied to the CPU at least once during a reference time, and generate a control signal based on whether the first clip frequency has been applied to the CPU at least once during the reference time. The mobile device further includes a clock management unit configured to apply a clock signal having one of the first clip frequency and a second clip frequency, to the CPU in response to the control signal, the second clip frequency being based on a representative temperature corresponding to a first group of clip frequencies that have been supplied to the CPU during the reference time.

In yet another example embodiment, the mobile device further includes a memory configured to store a first table including a second group of clip frequencies each having a reference temperature, and a second table including the first group of clip frequencies and the second group clip frequencies as well as timestamps respectively corresponding to the first group clip frequencies, the first group clip frequencies including the first clip frequency.

In yet another example embodiment, the system on chip further includes a plurality of thermal sensors, wherein the cooling frequency adjustor is configured to determine the current temperature based on a plurality of temperatures detected by the plurality of thermal sensors, and at least one of select the first clip frequency based on the current temperature, and determine the second clip frequency corresponding to the current temperature using the first group of clip frequencies in the second table.

In yet another example embodiment, the cooling frequency adjustor is configured to generate the control signal for generation of the clock signal having the second clip frequency when the first clip frequency has been supplied to the CPU at least once during the reference time, and generate the control signal for generation of the clock signal having the first clip frequency when the first clip frequency has not been supplied to the CPU during the reference time.

In yet another example embodiment, the cooling frequency adjustor is configured to detect a change in the current temperature, and increase one of the first and second clip frequencies by a frequency increase step based on the detected change in the current temperature, the clock management unit being configured to apply the clock signal having one of an increased first clip frequency and an increased second clip frequency, to the CPU.

In one example embodiment, a device includes a memory having computer-readable instructions stored therein and a processor. The processor is configured to execute the computer-readable instructions to determine a temperature value based on a plurality of temperature readings associated with the device, select an operating frequency based on the temperature value, at least one timestamp associated with the operating frequency and a reference time period, and generate at least one clock signal with the selected operating frequency, the clock signal being used for operation of the processor.

In yet another example embodiment, the device further includes a plurality of sensors configured to register the plurality of temperature readings, the processor being configured to execute the computer-readable instructions to receive the plurality of temperature readings from the plurality of sensors.

In yet another example embodiment, the processor is configured to execute the computer-readable instructions to determine the temperature value as one of a minimum of, a maximum of or an average of the plurality of temperature readings.

In yet another example embodiment, the processor is configured to execute the computer-readable instructions to determine the operating frequency by selecting one of a plurality of frequencies stored in a first table stored on the memory, the first table providing a correspondence between the plurality of frequencies and a plurality of temperature values, the one of the plurality of frequencies corresponding to the temperature value.

In yet another example embodiment, the processor is configured to execute the computer-readable instructions to determine whether the operating frequency has been repeated within the reference time period based on the at least one reference time associated with the operating frequency, and select the operating frequency as an average value of ones of the plurality of frequencies stored in the first table each of which has an associated timestamp that falls within the reference time period, if the at least one timestamp indicates that the operating frequency has been repeated within the reference time period.

BRIEF DESCRIPTION OF THE DRAWINGS

The above and other features and advantages of the inventive concept will become more apparent by describing in detail exemplary embodiments thereof with reference to the attached drawings in which:

FIG. 3 is a temperature and clip frequency table according to an example embodiment;

FIG. 4 is a clip frequency and timestamp table according to an example embodiment;

FIG. 10A is a diagram of a clip frequency curve appearing after a conventional cooling algorithm is used;

FIG. 10B is a diagram of a clip frequency curve appearing after a cooling algorithm according to an example embodiment;

DETAILED DESCRIPTION OF THE EXAMPLE EMBODIMENTS

Figure 1:
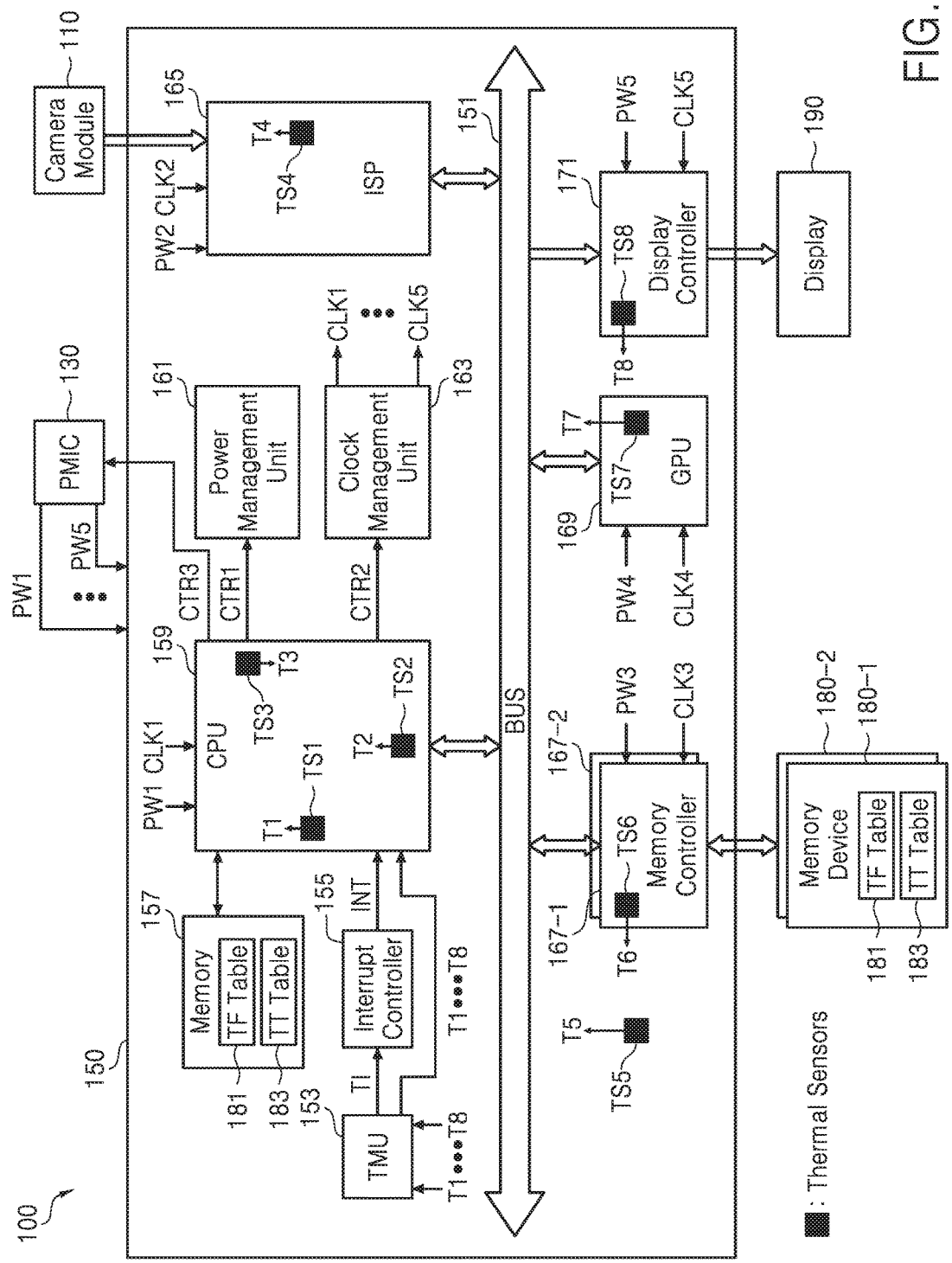
FIG. 1 is a block diagram of a data processing system according to an example embodiment.

Inventive concepts now will be described more fully hereinafter with reference to the accompanying drawings, in which example embodiments are shown. Example embodiments may, however, be embodied in many different forms and should not be construed as limited to the example embodiments set forth herein. Rather, these example embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular example embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The term "clip frequency" means a maximum frequency which is set or restricted for the cooling of an electronic system (e.g., a data processing system). Dynamic frequency scaling (DFS), which is also known as CPU throttling, is a power-saving technique used in computer architecture. According to this technique, the operating frequency of a central processing unit (CPU) may be automatically adjusted on the fly in order to preserve power or to reduce the amount of heat generated in the CPU. Accordingly, clip frequency may mean an operating frequency for CPU throttling; and CPU throttling (or simply "throttling") may mean restricting a maximum operating frequency for CPU cooling. CPU releasing may mean to release the restricted maximum operating frequency. Accordingly, a clip frequency may be a restricted maximum frequency in CPU throttling.

In the example embodiments of the inventive concepts described below, adjusting a clip frequency may be a process of generating clock signals having the clip frequency according to the control of a cooling frequency adjuster of a clock management unit. The cooling frequency adjuster which performs a cooling algorithm may be implemented either in hardware or in software.

FIG. 1 is a block diagram of a data processing system, according to an example embodiment. Referring to FIG. 1, the data processing system 100 may include a camera module 110, a power management integrated circuit (PMIC) 130, a controller a plurality of memory devices 180-1 and 180-2, and a display 190.

The data processing system 100 may be implemented as a mobile device or a mobile computing device, as a laptop computer, a cellular phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internee device (MID), a wearable computer, an Internet of Things (IoT) device, an Internet of Everything (IoE) device, a drone, or an e-book.

The camera module 110 may convert an optical image into electrical image data. For example, the camera module 110 may include a complementary metal-oxide semiconductor (CMOS) image sensor chip and a mechanical device which controls the operation of the CMOS image sensor chip. For example, the camera module 110 may transmit electrical image data to the controller 150 using mobile industry processor interface (Mlle) camera serial interface (CSI).

The PMIC 130 may supply an operating voltage to each of the elements (or components) 110, 150, 180-1, 180-2, and 190 included in the data processing system 100. The PMIC 130 may supply a plurality of operating voltages PW1 through PW5 to the controller 150 in response to a third control signal CTR3 output from the controller 150.

The controller 150 may control the operation of each of the elements 110, 130, 180-1, 180-2, and 190. The controller 150 may be implemented as an IC, a system on chip (SoC), an application processor (AP), a mobile AP, a chip set, or a set of semiconductor chips, but inventive concepts are not restricted thereto.

The controller 150 may include thermal sensors TS1 through TS8, a bus 151, a temperature management unit (TMU) 153, an interrupt controller 155, an internal memory 157, a CPU 159, a power management unit (PMU) 161, a clock management unit (CMU) 163, and a plurality of hardware intellectual properties (IPs). In the example embodiments described herein, an IP may be a function block or a circuit (or circuitry) used in the controller 150. Although an image signal processor (ISP) 165, a plurality of memory controllers 167-1 and 167-2, a graphics processing unit (GPU) 169, and a display controller 171 are shown as the hardware IPs in the embodiments illustrated in FIG. 1, these are just examples. The following hardware IPs may also be additionally integrated into or implemented in the controller 150: a multi-core processor, a memory device, a universal serial bus (USB), a peripheral component interconnect (PCI), a digital signal processor (DSP), a wired interface, a wireless interface, a controller, a hardware codec, a video module (e.g., a camera interface, a Joint Photographic Experts Group (JPEG) processor, a video processor, or a mixer), a three-dimensional (3D) graphic core, an audio system, or a driver.

The thermal sensors TS1 through TS8 may be arranged in or integrated into the controller 150. For example, the thermal sensors TS1 through TS3 may be placed inside the CPU 159; the thermal sensor TS4 may be placed inside the ISP 165, the thermal sensor TS5 may be placed inside or outside a printed circuit board (PCB) of the controller 150; the thermal sensor TS6 may be placed inside each of the memory controllers 167-1 and 167-2, the thermal sensor TS7 may be placed inside the GPU 169, and the thermal sensor TS8 may be placed inside the display controller 171, but inventive concepts are not restricted to the example embodiments described herein. For example, each of the thermal sensors TS1 through TS8 may be placed around a hot spot of a corresponding one of the elements 159, 165, 167-1, 167-2, 169, and 171.

Each of the thermal sensors TS1 through TS8 may monitor or detect an ambient temperature of a corresponding one of the elements 159, 165, 167-1, 167-2, 169, and 171 and output temperature information T1, T2, T3, T4, T5, T6, T7, or T8 according to the monitoring result. The temperature information T1, T2, T3, T4, T5, T6, T7, or T8 is simply referred to as a "temperature". The elements 159, 165, 167-1, 167-2, 169, and 171 may communicate data through the bus 151.

The TMU 153 may generate an instruction signal TI for controlling the enabling (or on) or the disabling (or oft) of the interrupt controller 155 using the temperatures T1 through T8 respectively output from the thermal sensors TS1 through TS8. The TMU 153 may generate the instruction signal TI to enable the interrupt controller 155 based on a maximum temperature, a minimum temperature, or an average temperature an average value) of the temperatures T1 through T8 output from the thermal sensors TS1 through TS8.

The TMU 153 may transmit the temperatures T1 through T8 output from the thermal sensors TS1 through TS8 to the CPU 159. Although the TMU 153 transmits the temperatures T1 through T8 to the CPU 159 in the example embodiments illustrated in FIG. 1, the temperatures T1 through T8 may be directly output from the thermal sensors TS1 through TS8 to the CPU 159 in other example embodiments.

The interrupt controller 155 may generate an interrupt signal INT activated in response to the instruction signal TI and may generate the interrupt signal INT deactivated in response to the instruction signal TI generated for disabling the interrupt controller 155.

The internal memory 157 may be used as an operation memory of the CPU 159. The internal memory 157 may store a first table 181 which will be described with reference to FIG. 3 and a second table 183 which will be described with reference to FIG. 4. The internal memory 157 may be formed of a volatile memory such as random access memory (RAM), dynamic RAM (DRAM), static RAM (SRAM), cache, or tightly coupled memory (TCM). Although the internal memory 157 is placed outside the CPU 159 in the example embodiments illustrated in FIG. 1, the internal memory 157 may be a cache (e.g., a data cache) formed in the CPU 159 in other example embodiments.

For example, when the controller 150 is booted, the first table 181 and the second table 183 stored in the memory devices 180-1 and 180-2 may be loaded to the internal memory 157 according to the control of the CPU 159 and the first table 181 and the second table 183 stored in the internal memory 157 may be accessed and updated by a thermal driver 220 which is implemented or executed in the CPU 159.

The CPU 159 may implement, in real-time or on the fly, at least one algorithm from among a cooling algorithm for power saving, a cooling algorithm for performance improvement, and a cooling algorithm for selecting a reference temperature, which will be described below, in response to the interrupt signal INT, The CPU 159 may generate each of control signals CTR1 through CTR3 using at least one of the three cooling algorithms mentioned above based on the temperatures T1 through T8 output from the TMU 153.

The CPU 159 may include a single core or a plurality of cores. The plurality of cores may include heterogeneous cores. For example, each of the thermal sensors TS1 through TS3 may be placed in a corresponding one of the heterogeneous cores. For example, the heterogeneous cores may be ARM® big.LITTL™ developed by ARM Holdings plc (ARM).

The CPU 159 may operate using the first operating voltage PW1 provided by the 130 and a first clock signal CLK1 provided by the CMU 163.

Figure 2:
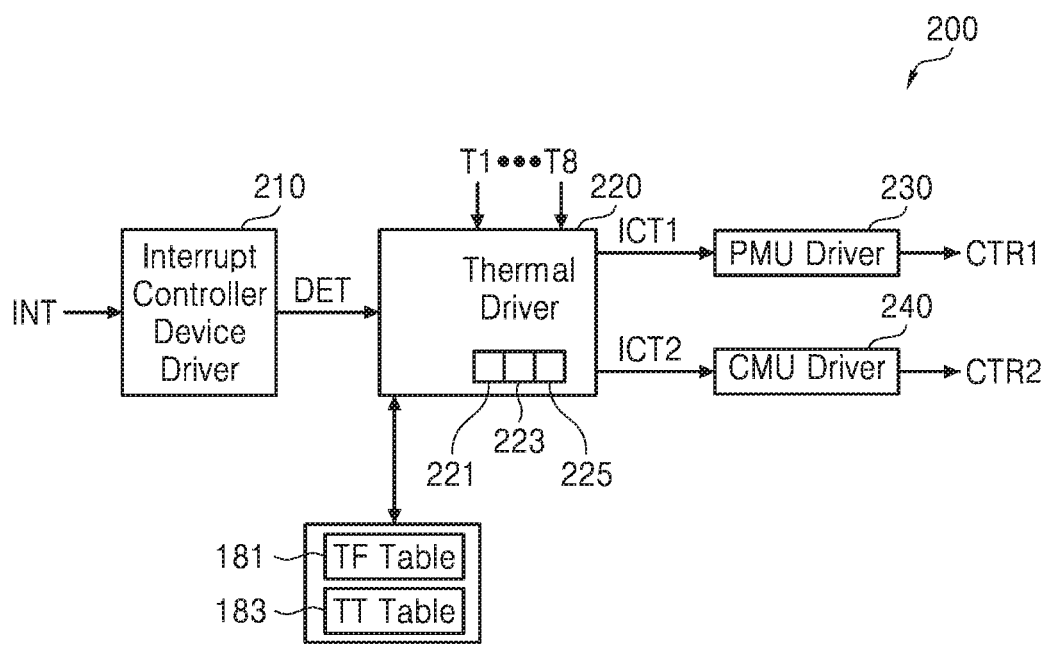
FIG. 2 is a block diagram of a cooling frequency adjustor which implements cooling algorithm according to an example embodiment.

FIG. 2 is a block diagram of a cooling frequency adjustor which implements a cooling algorithm, according to an example embodiment. Referring to FIGS. 1 and 2, the cooling frequency adjustor 200 may be implemented in hardware inside the CPU 159 or in software executed in the CPU 159. Accordingly, the CPU 159 may control or execute the cooling frequency adjustor 200. While the cooling frequency adjustor 200 shown in FIG. 2 has a plurality of components, the respective functionalities of which are separately described below, example embodiments are not limited thereto. For example, the functionalities of the components of the cooling frequency adjustor 200 may be provided as a set of computer-readable instructions stored on a memory (e.g., the memory device 180-1 or the internal memory 157), which when executed by the CPU 159, transform the CPU 159 into a special purposes processor for implementing set functions.

The cooling frequency adjustor 200 may include an interrupt controller device driver 210, a thermal driver 220, a PMU driver 230, and a CMU driver 240. Although the cooling frequency adjustor 200 performs dynamic voltage and frequency scaling (DVFS) in example embodiments illustrated in FIG. 2, inventive concepts may also be applied to dynamic frequency scaling (DFS). When the cooling frequency adjustor 200 uses DFS, the PMU driver 230 may not be implemented.

The interrupt controller device driver 210 may generate a trigger signal DET for triggering the operation of the thermal driver 220 in response to the interrupt signal INT activated. The thermal driver 220 may implement or execute at least one of the three cooling algorithms in response to the trigger signal DET and may generate the control signals CTR1 through CTR3 based on the execution result.

The thermal driver 220 may access or refer to the first table 181, which will be described with reference to FIG. 3, and determine a clip frequency corresponding to a current temperature based on the trigger signal DET and the temperatures T1 through T8. The thermal driver 220 may also access or refer to the second table 183, which will be described with reference to FIG. 4, and determine (calculate) in real time a clip frequency corresponding to the current temperature based on the trigger signal DET and the temperatures T1 through T8.

The thermal driver 220 may include or store thereon first information 221, second information 223, and third information 225. The first information 221 includes information about a reference time which will be described with reference to FIG. 5; the second information 223 includes information about a desired (and/or alternatively, predetermined) time and clip frequency increase step information, which will be described with reference to FIG. 7; and the third information 225 includes information about selecting the reference time, which will be described with reference to FIG. 9.

When the cooling frequency adjustor 200 is implemented in hardware, the information 221, 223, and 225 may be stored in a register or memory. When the cooling frequency adjustor 200 is implemented as software executed by a processor (e.g., the thermal driver 220), the information 221, 223, and 225 may refer to as a code or data.

The thermal driver 220 may implement or execute at least one of the three cooling algorithms and may generate a first internal control signal ICT1 and a second internal control signal ICT2 based on the performing result or execution result.

The PMU driver 230 may generate the first control signal CTRL for controlling the PMU 161 in response to the first internal control signal ICT1. The CMU driver 240 may generate the second control signal CTR2 for controlling the CMU 163 in response to the second internal control signal ICT2.

The PMU 161 may manage (e.g., increase, maintain, or decrease) power (or an operating voltage) supplied to a corresponding one of the elements 151, 159, 165, 167-1, 167-2, 169, and 171 based on the first control signal CTRL.

The CMU 163 may manage (e.g., increase, maintain, or decrease) the frequency (or clip frequency) of a clock signal CLK1, CLK2, CLK3, CLK4, or CLK5 supplied to a corresponding one of the element 159, 165, 167-1, 167-2, 169, and 171 based on the second control signal CTR2.

The ISP 165 may operate using the second operating voltage PW2 supplied from the PMIC 130 and the second clock signal CLK2. The ISP 165 may receive and process electrical image data output from the camera module 165 to generate processed image data.

Each of the memory controllers 167-1 and 167-2 may operate using the third operating voltage PW3 supplied from the PMIC 130 and the third clock signal CLK3 supplied from the CMU 163. Although the third operating voltage PW3 and the third clock signal CLK3 are supplied to each of the memory controllers 167-1 and 167-2 in the example embodiments illustrated in FIG. 1, an operating voltage and a clock signal supplied to the first memory controller 167-1 may be different from an operating voltage and a clock signal supplied to the second memory controller 167-2 in other embodiments.

In one example embodiment, when it is assumed that the first memory controller 167-1 is a DRAM controller and the second memory controller 167-2 is a flash-based memory controller, the first memory device 180-1 is a DRAM device and the second memory device 180-2 is a flash-based memory device. The flash-based memory device may be a multimedia card (MMC), an embedded MMC (eMMC), or a universal flash storage (UFS).

In one example embodiment, when the data processing system 100 is booted, the first table 181 and the second table 183 stored in the second memory device 180-2 may be loaded to the first memory device 180-1; and the first table 181 and the second table 183 stored in the first memory device 180-1 may be loaded to the internal memory 157.

The GPU 169 may operate using the fourth operating voltage PW4 supplied from the PMIC 130 and the fourth clock signal CLK4 supplied from the CMU 163. The GPU 169 may include a graphics engine which processes data to be displayed on the display 190.

The display controller 171 may operate using the fifth operating voltage PW5 supplied from the PMIC 130 and the fifth clock signal CLK5 supplied from the CMU 163. The display controller 171 may process data to be displayed on the display 190 and transmit the processed data to the display 190. The processed data may be transmitted to the display 190 using MIPI® display serial interface (DSI).

FIG. 3 is a temperature and clip frequency table according to an example embodiment. Referring to FIGS. 1 through 3, the first table 181 is a temperature and clip frequency table showing a clip frequency for each temperature. The controller 150 or the thermal driver 220 may determine or select one of clock frequencies stored in the first table 181 as a clip frequency at a particular temperature, e.g., a current temperature.

The particular temperature may be a minimum temperature (or a minimum value), a maximum temperature (or a maximum value), an average temperature (or an average value), or a mean temperature (or a mean value), which will be described with reference to FIG. 9. Clip frequencies CFreq1 through CFreq7 respectively corresponding to temperatures TC1 through TC7 may be set and stored in the first table 181 in advance. The particular temperature may be a current temperature of the data processing system 100 or the controller 150. The thermal driver 220 may determine (calculate) the current temperature using the temperatures T1 through T8 detected by the respective thermal sensors TS1 through TS8.

As described above, the clip frequencies CFreq1 through CFreq7 may be a maximum frequency restricted in throttling. For instance, the clip frequency CFreq1 is the highest one among the clip frequencies CFreq1 through CFreq7 and the clip frequency CFreq7 is the lowest one among the clip frequencies CFreq1 through CFreq7. The temperatures TC7 is the highest one among the temperatures TC1 through TC7 and the temperatures TC1 is the lowest one among the temperatures TC1 through TC7. In other words, CFreq1>CFreq2>CFreq3>CFreq4>CFreq5>CFreq6>CFreq7 and TC7>TC6>TC5>TC4>TC3>TC2>TC1. Each of the clip frequencies CFreq1 through CFreq7 is a frequency which will be generated by the CMU 163 and may be the maximum frequency of the clock signals CLK1 through CLK5.

Referring to the first table 181, when the current temperature of the data processing system 100 or the controller 150 is equal to or lower than TC2, the clip frequency is CFreq1; when the current temperature of the data processing system 100 or the controller 150 is higher than TC2 and equal to or lower than TC3, the clip frequency is CFreq2. When the current temperature of the data processing system 100 or the controller 150 is higher than TC7, the clip frequency CFreq7 is zero.

FIG. 4 is a clip frequency and timestamp table according to an example embodiment. Referring to FIGS. 1, 2, and 4, the second table 183 is a clip frequency and timestamp table showing a timestamp for each clip frequency selected during a reference time.

In one example embodiment, the data processing system 100 or the controller 150 maintain the second table 183 apart from the first table 181. The controller 150 or the thermal driver 220 may record a time (i.e., a timestamp), at which a clip frequency changes in a state where heat is generated, in the second table 183. For example, the first table 181 may not be updated while the second table 183 may be updated. A clip frequency and a timestamp of the clip frequency may be updated in the second table 183 over time. The second table 183 stores timestamps for recent clip frequencies and may thus be smaller than the first table 181.

Figure 5:
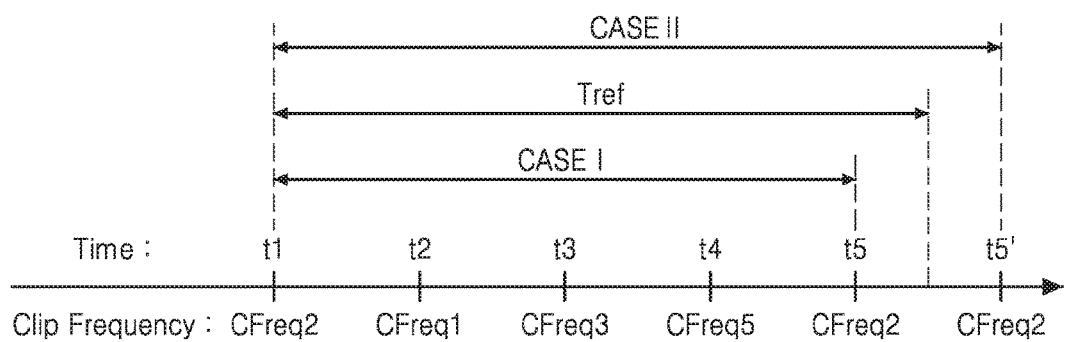
FIG. 5 is a conceptual diagram of a relationship between a reference time and a clip frequency according to an example embodiment.
Figure 6:
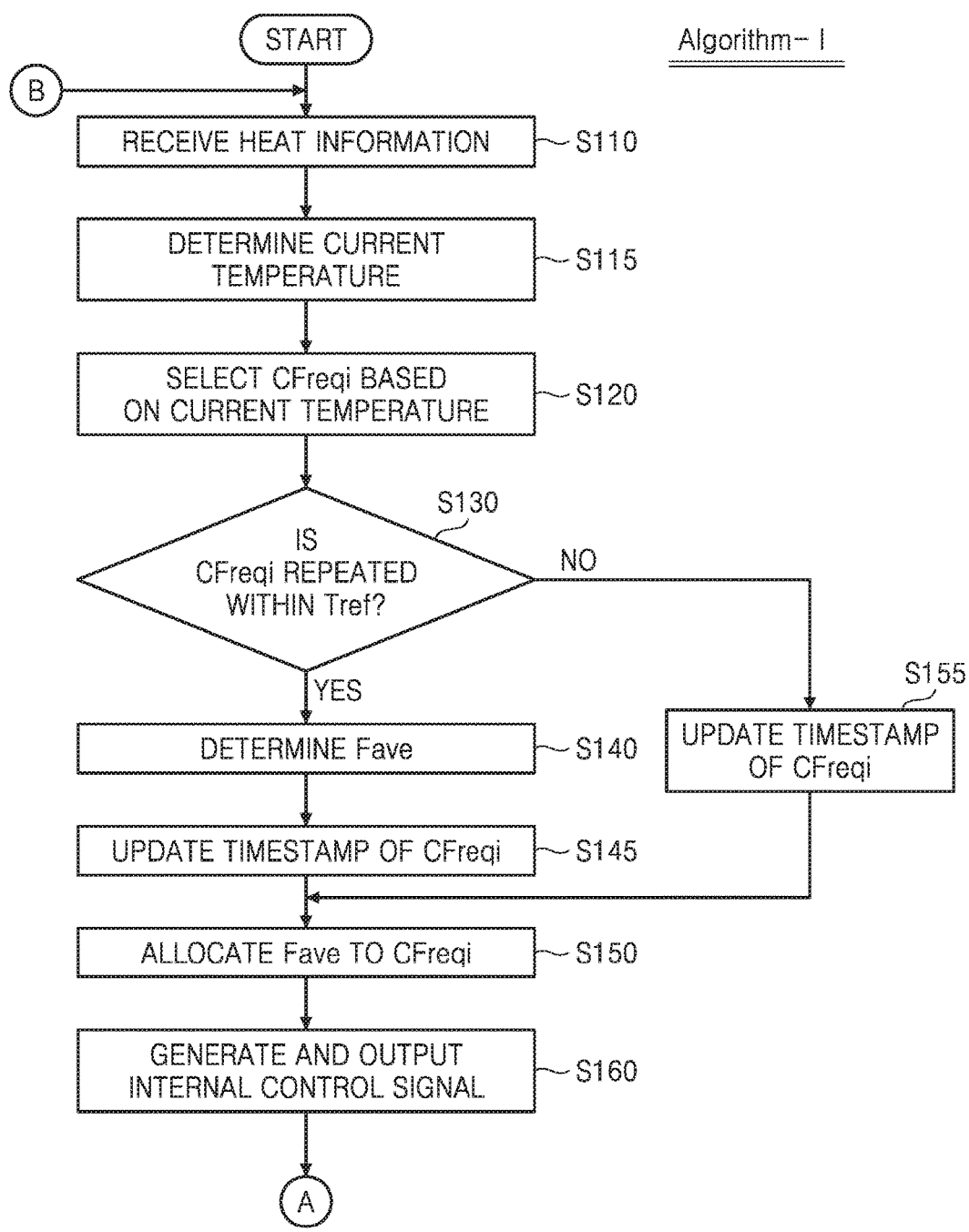
FIG. 6 is a flowchart of a cooling algorithm for power saving according to an example embodiment.

FIG. 5 is a conceptual diagram of the relationship between a reference time and a clip frequency according to an example embodiment. FIG. 6 is a flowchart of the cooling algorithm for power saving according to an example embodiment. Referring to FIGS. 1 through 6, when heat is generated with the operation of the controller 150, at S110, the TMU 153 (and more specifically the thermal driver 220 of the TMU 153) receives the temperatures T1 through T8 detected by the respective thermal sensors TS1 through TS8.

At S115, the thermal driver 220 determines (calculates or selects) a current temperature based on the received/detected heat information.

For example, the current temperature may be a maximum or a minimum temperature among the temperatures T1 through T8 or an average temperature of the temperatures T1 through T8, but inventive concepts are not restricted to the current example embodiments. For example, the thermal driver 220 may determine the maximum temperature, the minimum temperature, or the average temperature as the current temperature based on the third information 225. The thermal driver 220 may calculate the average temperature of the temperatures T1 through T8.

For instance, when the third information 225 is set to select one of the maximum temperature, the minimum temperature, and the average temperature as the current temperature; the thermal driver 220 may determine the maximum temperature, the minimum temperature, or the average temperature as the current temperature among the temperatures T1 through T8.

At S120, the thermal driver 220 selects a clip frequency based on the current temperature. In one example embodiment, the thermal driver 220 determines (calculates or selects) a current temperature based on the temperatures T1 through T8 and may search for or select a clip frequency CFreqi (where 1≤i≤7) corresponding to the calculated or selected current temperature from the first table 181.

CASE I shown in FIG. 5, will now be described with reference to FIGS. 1 through 6. It is assumed that each of time points t1, t2, t3, and t4 is the same as a timestamp for each time point t1, t2, t3, or t4 and each timestamp includes second, minute, and hour.

When the current temperature is TC2 at the current time point t5 in operation S115, the thermal driver 220 selects or determines the clip frequency CFreqi (=CFreq2) corresponding to the current temperature TC2 based on the first table 181 in operation S120.

Thereafter, the thermal driver 220 searches the second table 183. At S130, the thermal driver 220 determines whether the timestamp t1 of the clip frequency CFreqi (=CFreq2) corresponding to the current temperature TC2 exists during a reference time Tref in operation S130. In other words, the thermal driver 220 determines whether the clip frequency CFreqi (=CFreq2) is repeated within the reference time Tref in operation S130. The reference time Tref may be included in the first information 211.

In one example embodiment, there is a record of the clip frequency CFreqi (=CFreq2) corresponding to the current temperature TC2 having been selected at the previous time point t1 within the reference time Tref, as shown in FIG. 5. Accordingly at S130, the thermal driver 220 determines whether a time difference between the time points t5 and t1 is less than the reference time Tref.

If at S130 the thermal driver 220 determines that the time difference is less than Tref (i.e., |t5−t1|<Tref), at S140, the thermal driver 220 determines a representative frequency Fave of the clip frequencies CFreq2, CFreq1, CFreq3, and CFreq5 existing within the reference time Tref. A method of calculating the representative frequency Fave and a type of the representative frequency Fave may be changed according to different example embodiments. In one example embodiment, the thermal driver 220 determines the representative frequency Fave as an average frequency, a mean temperature, variance, or standard deviation of the available clip frequencies (e.g., CFreq1 to CFreq5), but examples embodiments are not restricted thereto. It is assumed that the representative frequency Fave is an average frequency in the example embodiments described herein.

For example, when CFreqi is 1.8 GHz, CFreq2 is 1.4 GHz, CFreq3 is 1.0 GHz, and CFreq5 is 0.5 GHz; the representative frequency Fave is 1.22 GHz.

At S145, the thermal driver 220 updates the previous timestamp t1 with the current timestamp t5 for the clip frequency CFreqi (=CFreq2) corresponding to the current temperature TC2 in the second table 183.

At S150, the thermal driver 220 allocates the average frequency Fave to a current clip frequency CFreqi.

At S160, the thermal driver 220 generates and outputs the second internal control signal ICT2 to the CMU driver 240 of the TMU 153. The CMU driver 240 in turn generates the second control signal CTR2. The CMU 163 may apply the first clock signal CLK1 having the current clip frequency CFreq corresponding to the average frequency Fave to the CPU 159 in response to the second control signal CTR2. The operating frequency of each of the clock signals CLK2 through CLK5 may be set to the current clip frequency CFreq.

When |t5−t1|<Tref, the thermal driver 220 does not apply the clip frequency CFreqi (=CFreq2) corresponding to the current temperature TC2 stored in the first table 181 to the controller 150 but applies the current clip frequency CFreq corresponding to the average frequency Fave which does not exist in the first table 181 to the controller 150 in real time. The thermal driver 220 may reset a clip frequency in order to prevent frequent transition between throttling and releasing.

CASE II as shown in FIG. 5 will now be described in detail with reference to FIGS. 1 through 6. When the current temperature is TC2 at a current time point t5' in operation S115, the thermal driver 220 selects or determines the clip frequency CFreqi (=CFreq2) corresponding to the current temperature TC2 based on the first table 181 in operation S120. The thermal driver 220 searches the second table 183. The thermal driver 220 may determine whether the timestamp t1 of the clip frequency CFreqi (=CFreq2) corresponding to the current temperature TC2 exists during the reference time Tref in operation S130.

In one example embodiment; there is a record of the clip frequency CFreqi (=CFreq2) corresponding to the current temperature TC2 having been selected at the previous time point t1 within the reference time Tref, as shown in FIG. 5. At this time, the thermal driver 220 may determine whether another time difference between the time points t5' and t1 is less than the reference time Tref in operation S130 (i.e., the time difference between t5 and t1, as discussed above with reference to S130, is greater than or equal to Tref.

In one example embodiment, if at S130 the thermal detector 220 determines that the time difference is greater than Tref (i.e., |t5−t1|≥Tref), at S155, the thermal driver 220 updates the previous timestamp t1 with the current timestamp t5' for the clip frequency CFreqi (=CFreq2) corresponding to the current temperature TC2 in the second table 183.

Thereafter, the process reverts to S150 and S150 and S160, as described above, are repeated. Accordingly, the thermal driver 220 generates and outputs the second internal control signal ICT2 and the CMU driver 240 generates the second control signal CTR2. The CMU 163 may apply the first clock signal CLK1 having the clip frequency CFreq (=CFreq2) corresponding to the current temperature TC2 to the CPU 159 in response to the second control signal CTR2 in operation S160. The operating frequency of each of the clock signals CLK2 through CLK5 may be set to the clip frequency CFreqi (=CFreq2).

Figure 7:
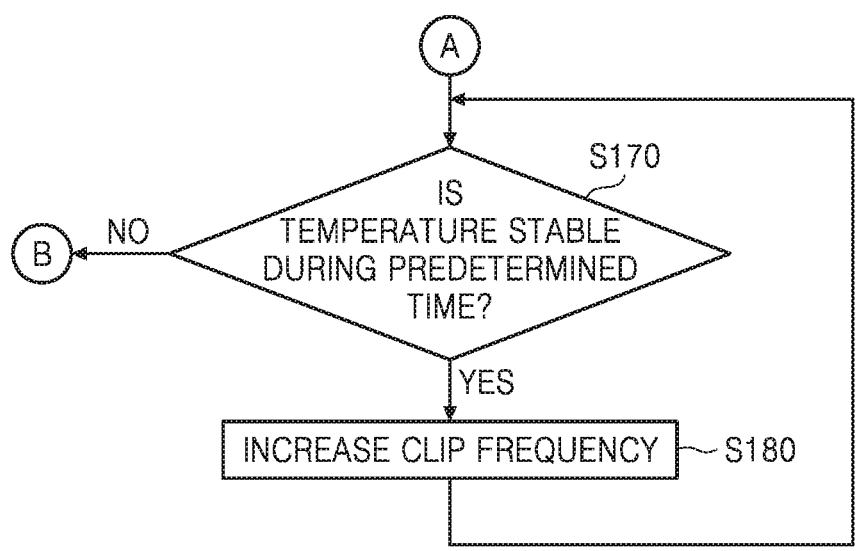
FIG. 7 is a flowchart of a cooling algorithm for performance improvement according to an example embodiment.

FIG. 7 is a flowchart of a cooling algorithm for performance improvement according to an example embodiment. Referring to FIG. 1 through even though each of the clock signals CLK1 through CLK5 having the average frequency Fave or the clip frequency CFreqi (=CFreq2) is applied to a corresponding one of the elements 159, 165, 167-1, 167-2, 169, and 171 in operation S160, when a current temperature does not increase or decreases during a desired (and/or alternatively predetermined) time in operation S170, at S180, the thermal driver 220 increases the average frequency Fave or the clip frequency CFreqi (=CFreq2) by a desired (and/or alternatively predetermined) increase step. Operations S170 and S180 may be repeatedly performed. As described above, the thermal driver 220 may select or calculate the current temperature based on the temperatures T1 through T8.

When each of the clock signals CLK1 through CLK5 having the average frequency Fave or the clip frequency CFreqi (=CFreq2) is applied to a corresponding one of the elements 159, 165, 167-1, 167-2, 169, and 171 and the current temperature increases within the desired (and/or alternatively predetermined) time in operation S170, the algorithm goes back to operation S110. As described above, the second information 223 may include information about the desired (and/or alternatively predetermined) time and information about the increase step (e.g., 100 MHz) for the clip frequency Fave or CFreqi.

Figure 8:
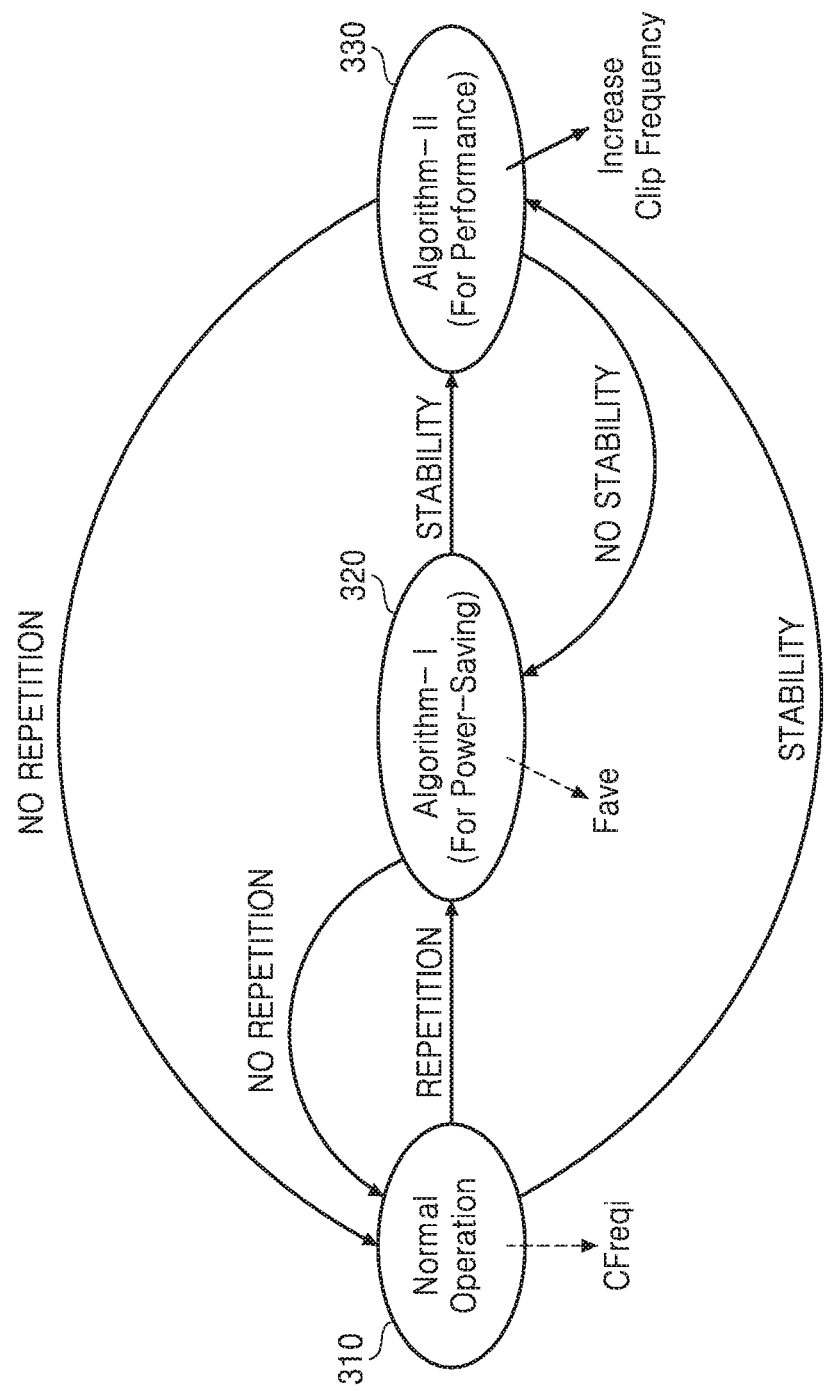
FIG. 8 is a state diagram for the implementation of a cooling algorithm according to an example embodiment.

FIG. 8 is a state diagram for the execution of a cooling algorithm according to an example embodiment. Referring to FIGS. 1 through 8, "REPETITION" indicates that the clip frequency CFreqi corresponding to a current temperature is repeated during the reference time Tref (CASE I) and "NO-REPETITION" indicates that the clip frequency CFreqi corresponding to the current temperature is not repeated during the reference time Tref (CASE II), as has been described in operation S130 with reference to FIGS. 5 and 6. "STABILITY" indicates that a current temperature does not increase or decreases during a desired (and/or alternatively predetermined) time even though each of the clock signals CLK1 through CLK5 having the clip frequency Fave or CFreqi is applied to a corresponding one of the elements 159, 165, 167-1, 167-2, 169, and 171; and "NO STABILITY" indicates instability.

A normal operation 310 is an operation in which each of the clock signals CLK1 through CLK5 having the clip frequency CFreqi stored in the first table 181 is applied to a corresponding one of the elements 159, 165, 167-1, 167-2, 169, and 171, as described with reference to FIG. 6. Algotithm-I 320 is an operation in which each of the clock signals CLK1 through CLK5 having the representative frequency Fave is applied to a corresponding one of the elements 159, 165, 167-1, 167-2, 169, and 171, as described with reference to FIG. 6. Algorithm-II 330 is an operation of increasing the clip frequency by the increase step, as described with reference to FIG. 7.

As shown in FIG. 8, when the REPETITION is confirmed in the normal operation 310 involved in the generation of the clip frequency CFreqi, the thermal driver 220 may transit from a normal mode for the normal operation 310 to a power-saving mode for the execution of the algorithm-I 320. When the STABILITY is confirmed in the normal operation 310, the thermal driver 220 may transit from the normal mode to a performance mode for the execution of the algorithm-II 330.

When the STABILITY is confirmed in the algorithm-I 320 involved in the generation of the representative frequency Fave, the thermal driver 220 may transit from the power-saving mode to the performance mode. When NO STABILITY is confirmed in the power saving mode, the thermal driver 220 may transit from the power-saving mode to the normal mode. When NO STABILITY is confirmed in the performance mode, the thermal driver 220 may transit from the performance mode to the normal mode. When NO STABILITY is confirmed in the performance mode, the thermal driver 220 may transit from the performance mode to the normal mode.

Figure 9:
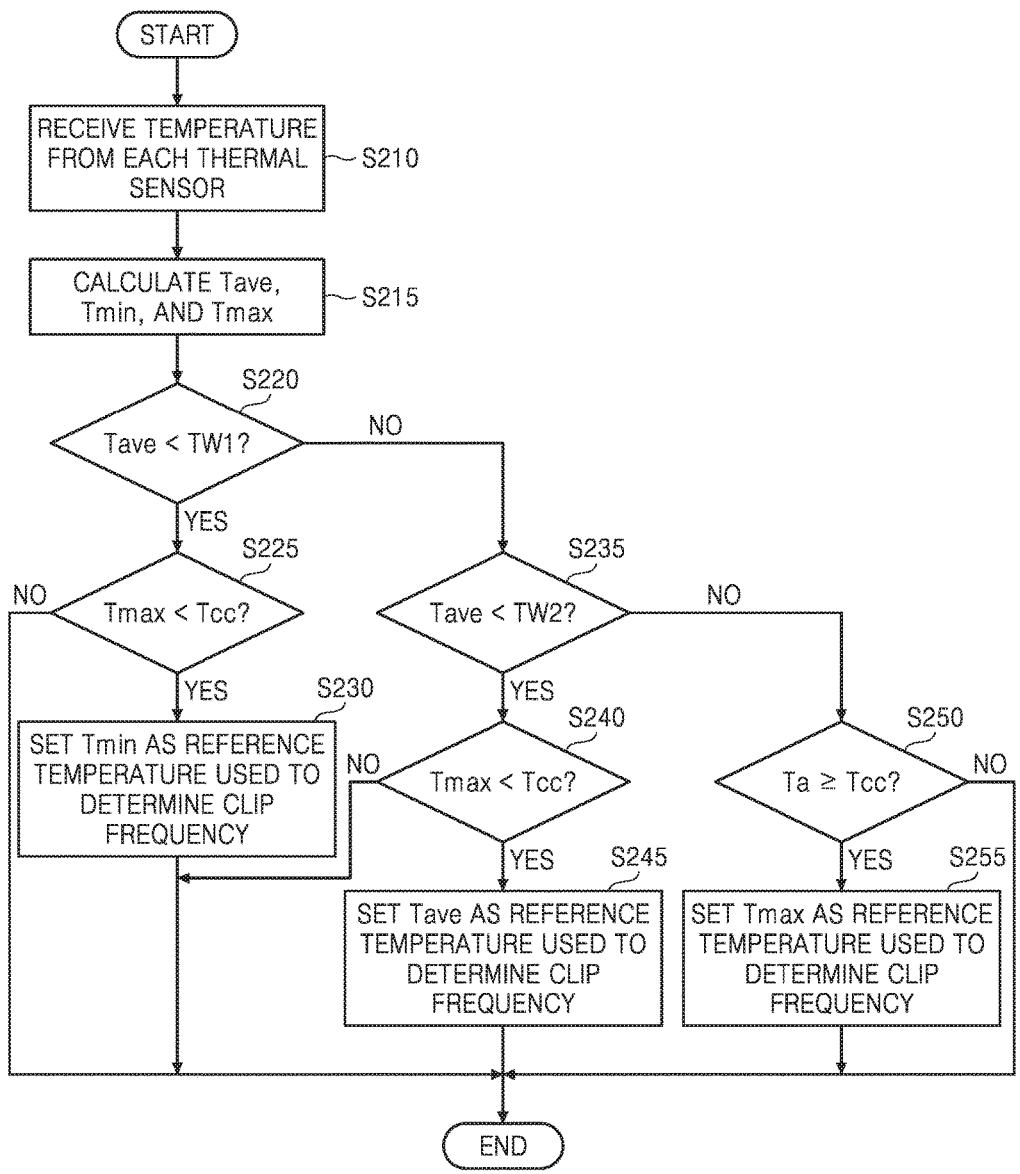
FIG. 9 is a flowchart of a method of selecting a reference temperature used to select a clip frequency according to an example embodiment.

FIG. 9 is a flowchart of a method of selecting a reference temperature used to select a clip frequency according to an example embodiment. Conventionally, a maximum temperature among the temperatures T1 through T8 detected by the thermal sensors TS1 through TS8 is determined as a current temperature and a clip frequency is determined using the maximum temperature. However, the thermal driver 220 may select a temperature, which determines a clip frequency, using the third information 225.

In other words, a reference temperature used to determine or select a clip frequency may be determined according to an average temperature of the data processing system 100 or the controller 150. The reference temperature may be the maximum or minimum temperature among the temperatures T1 through T8 detected by the thermal sensors TS1 through TS8 or the average temperature of the temperatures T1 through T8. Which one of the maximum temperature, the minimum temperature, and the average temperature is the reference temperature, may be determined based on the third information 225.

Referring to FIG. 9, at S210, the thermal driver 220 receives the temperatures T1 through T8 detected by the thermal sensors TS1 through TS8. At S215, the thermal driver 220 determines (calculates) an average temperature Tave, a minimum temperature Tmin, and a maximum temperature Tmax using the temperatures T1 through T8. It is assumed that a second reference temperature TW2 is higher than a first reference temperature TW1 and a third reference temperature Tcc is higher than the second reference temperature TW2.

At S220, the thermal driver 220 determines whether the average temperature Tave is lower than the first reference temperature TW1. If the thermal driver 220 determines at S220 that the average temperature Tave is lower than the first reference temperature TW1, at S225, the thermal driver 220 determines whether the maximum temperature Tmax is lower than the third reference temperature Tcc.

If at S225, the thermal driver 220 determines that the maximum temperature Tmax is lower than the third reference temperature Tcc, at S230 the thermal driver 220 sets the minimum temperature Tmin as the reference temperature used to determine a clip frequency. However, if at S225, the thermal driver 220 determines that the maximum temperature Tmax is equal to or greater than the third reference temperature, the process may end.

However, if at S220, the thermal driver 220 determines that the average temperature Tave is equal to or higher than the first reference temperature TW1, then at S235, the thermal driver 220 determines whether the average temperature Tave is lower than the second reference temperature TW2. If at S235, the thermal driver 220 determines that the average temperature Tave is equal to or greater than the first reference temperature TW1, then at S240, thermal driver 220 determines whether the maximum temperature Tmax is lower than the third reference temperature Tcc.

If at S240, the thermal driver 220 determines that maximum temperature Tmax is lower than the third reference temperature Tcc, then at S245, the thermal driver 220 sets the average temperature Tave as the reference temperature used to determine a clip frequency. However, if at S240, the thermal driver 220 determines that the maximum temperature Tmax is equal to or greater than the third reference temperature Tee, then the process may end.

However, if at S235, the thermal driver 220 determines that the average temperature Tave is equal to or higher than the second reference temperature TW2, then at S250, the thermal driver 220 determines whether each of the temperatures T1 through T8 is equal to or higher than the third reference temperature Ice in operation S250. If at S250, the thermal driver 220 determines that the temperatures T1 through T8 (collectively denoted by "Ta") are equal to or higher than the third reference temperature Tec, then at S255, the thermal driver 220 sets the maximum temperature Tmax as the reference temperature used to determine a clip frequency. However, if at S250, the thermal driver 220 determines that Ta is lower than the third reference temperature Tee, then the process may end.

Referring to FIG. 3, it is assumed that the minimum temperature Tmin is TC2, the average temperature Tave is TC3, and the maximum temperature Tmax is TC4. When the minimum temperature Tmin (=TC2) is determined as the reference temperature, the clip frequency is CFreq1. When the average temperature Tave (=TC3) is determined as the reference temperature, the clip frequency is CFreq2. When the maximum temperature Tmax (=TC4) is determined as the reference temperature, the clip frequency is CFreq3. In other words, a different clip frequency may be determined depending on how the reference temperature is determined.

The third information 225 may include information about whether a reference temperature used to determine a clip frequency is a minimum temperature, an average temperature, or a maximum temperature. In some example embodiments, the third information 225 may include information (e.g., TW1, TW2, and Tee) necessary to perform the cooling algorithm illustrated in FIG. 9. The information (e.g., TW1, TW2, and Tee) necessary to perform the cooling algorithm illustrated in FIG. 9 may be changed or updated according to the control of the CPU 159.

The cooling frequency adjustor 200 and more particularly the thermal driver 220 may decide which of temperature windows the average temperature of the temperatures T1 through T8 belongs to and may determine one of the maximum temperature Tmax, the minimum temperature Tmin, and the average temperature Tave of the temperatures T1 through T8 as a current temperature according to the decision result. For example, a first temperature window may be a range lower than the first reference temperature TW1, a second temperature window may be a range which is equal to or higher than the first reference temperature TW1 and lower than the second reference temperature TW2, and a third temperature window may be a range which is equal to or higher than the second reference temperature TW2.

FIG. 10A is a diagram of a clip frequency curve appearing after a conventional cooling algorithm is used. FIG. 10B is a diagram of a clip frequency curve appearing after a cooling algorithm according to an example embodiment. Referring to portions C1 and C2 illustrated in FIG. 10A and portions C1 and C2 illustrated in FIG. 10B, the number of transitions between CPU throttling and CPU releasing in each of the portions C1 and C2 illustrated in FIG. 10B is significantly fewer than the number of transitions between CPU throttling and CPU releasing in each of the portions C1 and C2 illustrated in FIG. 10A.

Figure 11A:
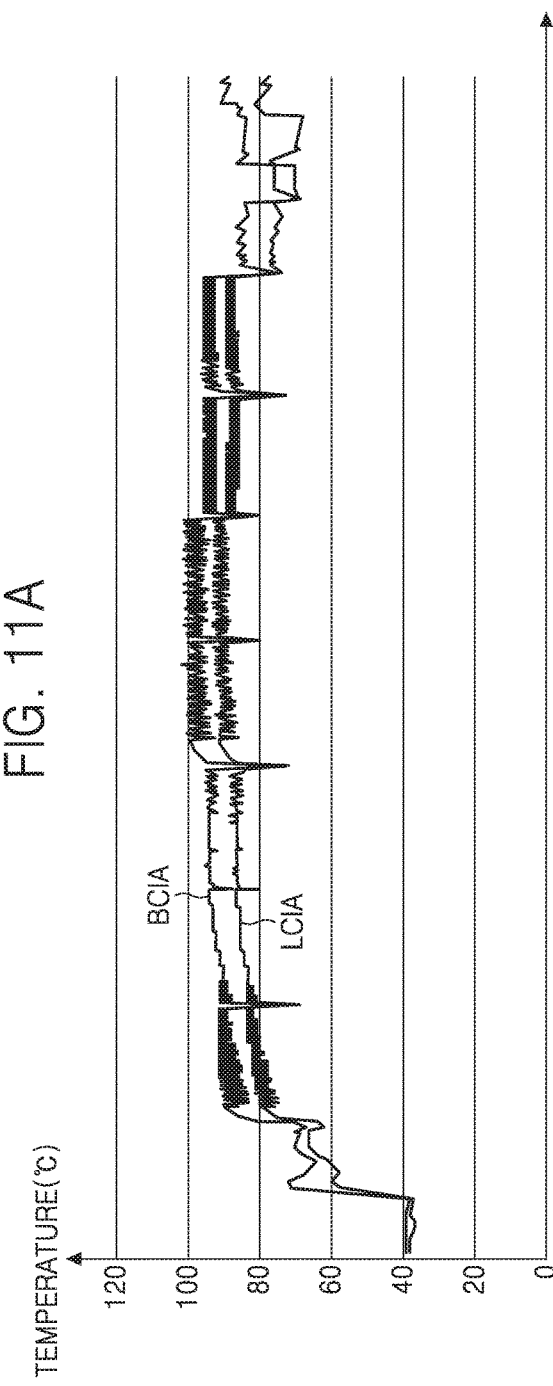
FIG. 11A is a diagram of a temperature curve of each core after a conventional cooling algorithm is used.
Figure 11B:
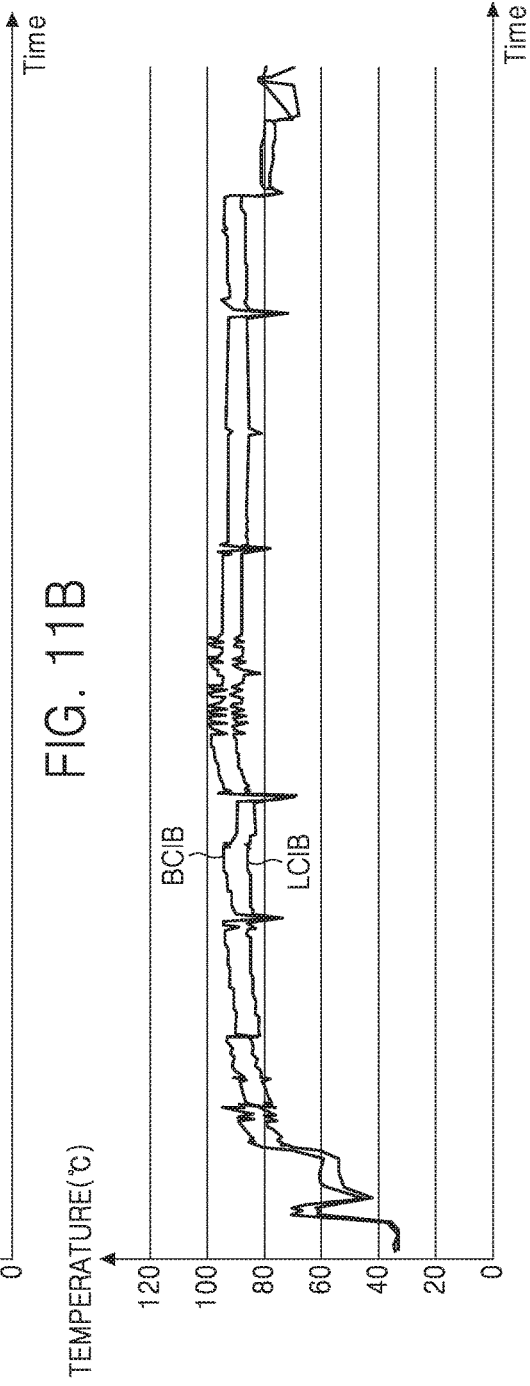
FIG. 11B is a diagram of a temperature curve of each core after a cooling algorithm according to an example embodiment.

FIG. 11A is a diagram of a temperature curve of each core after a conventional cooling algorithm is used. FIG. 11B is a diagram of a temperature curve of each core after a cooling algorithm according to an example embodiment. In FIGS. 11A and 11B, temperature curves BCIA and BCIB indicate the temperature of ARM's big core and temperature curves LCIA and LCIB indicate the temperatures of ARM's LITTLE core. Referring to FIGS. 11A and 11B, the change in the temperature curves BCIB and LCIB illustrated in FIG. 11B is significantly less than the change in the temperature curves BCIA and LCIA illustrated in FIG. 11A.

As the number of transitions and the amount of change are decreased, unnecessary current consumption is decreased, and therefore, thermal resistance is decreased. As a result, the performance of the controller 150 or the performance of the data processing system 100 including the controller 150 can be improved.

As described above, according to some example embodiments of inventive concepts, an integrated circuit and a mobile device including the same appropriately use at least one of a plurality of cooling algorithms implemented in the integrated circuit. In addition, the integrated circuit and the mobile device overcome the problems of heating in the integrated circuit and prevent performance degradation which may occur in cooling.

While inventive concepts have been particularly shown and described with reference to example embodiments, it will be understood by those of ordinary skill in the art that various changes in forms and details may be made therein without departing from the spirit and scope of inventive concepts as defined by the following claims.

What is claimed is:

1. An integrated circuit comprising:
   a memory configured to store,
      a first table listing a plurality of clip frequencies respectively corresponding to a plurality of reference temperatures,
      a second table listing one or more of the plurality of clip frequencies and one or more timestamps, each of the one or more timestamps respectively corresponding to the one or more of the plurality of clip frequencies, and
      computer-readable instructions; and
   at least one processor configured to execute the computer-readable instructions to,
      select one of the plurality of clip frequencies stored in the first table as a first clip frequency,
      store a current timestamp of the first clip frequency in the second table listing the one or more timestamps,
      determine whether the first clip frequency has been repeated during a time period, and
      control an operating frequency of the at least one processor based on whether the first clip frequency has been repeated.

2. The integrated circuit of claim 1, further comprising:
   a plurality of thermal sensors; and
   wherein the at least one processor is further configured to execute the computer-readable instructions to,
      determine a current temperature based on a plurality of temperatures detected by the plurality of thermal sensors,
      at least one of,
         select the first clip frequency based on the current temperature, and
         determine a second clip frequency corresponding to the current temperature based on the one or more of the plurality of clip frequencies in the second table, and
      control the operating frequency by controlling a clock signal applied to the at least one processor to have one of the first clip frequency or the second clip frequency.

3. The integrated circuit of claim 2, wherein
   the at least one processor is configured to execute the computer-readable instructions to adjust a previous timestamp of the first clip frequency with the current timestamp of the first clip frequency;
   the one or more of the plurality of clip frequencies include the first clip frequency; and
   the one or more timestamps include the previous timestamp of the first clip frequency.

4. The integrated circuit of claim 2, wherein the second clip frequency is different from any of the plurality of clip frequencies in the first table.

5. The integrated circuit of claim 2, wherein the second clip frequency is an average of the one or more of the plurality of clip frequencies in the second table.

6. The integrated circuit of claim 2, wherein the at least one processor is configured to execute the computer-readable instructions to,
   output a determination result signal to control the clock signal.

7. The integrated circuit of claim 2, wherein the at least one processor is configured to execute the computer-readable instructions to,
   control the clock signal to have the second clip frequency in response to determining that the first clip frequency has been repeated, and
   control the clock signal to have the first clip frequency in response to determining that the first clip frequency has not been repeated.

8. The integrated circuit of claim 2, wherein the at least one processor is configured to execute the computer-readable instructions to,
   determine which one of a plurality of temperature windows that an average temperature of the plurality of temperatures belongs to, and
   determine, based on a temperature window to which the average temperature belongs, the current temperature as one of (i) the average temperature, (ii) a maximum temperature of the plurality of temperatures, and (iii) a minimum temperature of the plurality of temperatures.

9. The integrated circuit of claim 2, wherein
   the at least one processor is configured to execute the computer-readable instructions to,
      detect a change in the current temperature,
      obtain an increased clip frequency by increasing one of the first clip frequency or the second clip frequency by a frequency increase step based on the change in the current temperature, and
      control the clock signal to have the increased clip frequency.

10. An integrated circuit comprising:
    at least one processor configured to,
       determine whether a first clip frequency corresponding to a first temperature of the integrated circuit has been previously supplied to the at least one processor at least once during a time period, and
       control a clock signal applied to the at least one processor to have one of the first clip frequency or a second clip frequency of a first group of clip frequencies by generating a control signal based on whether the first clip frequency has been previously supplied to the at least one processor at least once during the time period; wherein
the second clip frequency is based on a second temperature corresponding to the first group of clip frequencies that have been supplied to the at least one processor during the time period.

11. The integrated circuit of claim 10, further comprising:
a memory configured to store,
a first table including a second group of clip frequencies, each having a corresponding reference temperature; and
a second table including the first group of clip frequencies as well as timestamps respectively corresponding to the first group of clip frequencies, the first group of clip frequencies including the first clip frequency.

12. The integrated circuit of claim 11, further comprising:
a plurality of thermal sensors,
wherein the at least one processor is configured to,
determine the first temperature based on a plurality of temperatures detected by the plurality of thermal sensors, and
at least one of,
select the first clip frequency based on the first temperature, and
determine the second clip frequency corresponding to the first temperature based on the first group of clip frequencies.

13. The integrated circuit of claim 12, wherein the at least one processor is configured to,
generate the control signal for generation of the clock signal having the second clip frequency in response to determining that the first clip frequency has been previously supplied to the at least one processor at least once during the time period, and
generate the control signal for generation of the clock signal having the first clip frequency in response to determining that the first clip frequency has not been previously supplied to the at least one processor during the time period.

14. The integrated circuit of claim 12, wherein the at least one processor is configured to,
determine which one of a plurality of temperature windows that an average temperature of the plurality of temperatures belongs to, and
determine, based on a temperature window to which the average temperature belongs, the first temperature as one of (i) the average temperature, (ii) a maximum temperature of the plurality of temperatures, and (iii) a minimum temperature of the plurality of temperatures.

15. The integrated circuit of claim 12, wherein the at least one processor is configured to,
detect a change in the first temperature, and
obtain an increased clip frequency by increasing one of the first clip frequency and the second clip frequency by a frequency increase step based on the change in the first temperature, and
control the clock signal to have the increased clip frequency.

16. A device comprising:
a memory having computer-readable instructions stored therein; and
a processor configured to execute the computer-readable instructions to,
determine a temperature value based on a plurality of temperature readings associated with the device;
determine an operating frequency based on the temperature value, at least one timestamp associated with the operating frequency and a time period, wherein to determine the operating frequency the processor is configured to execute the computer-readable instructions to,
select one of a plurality of frequencies stored in a first table stored on the memory, the first table providing a correspondence between the plurality of frequencies and a plurality of temperature values, the one of the plurality of frequencies corresponding to the temperature value;
determine whether the operating frequency has been repeated within the time period based on the at least one time associated with the operating frequency, and
select the operating frequency as an average value of ones of the plurality of frequencies stored in the first table each of which has an associated timestamp that falls within the time period, if the at least one timestamp indicates that the operating frequency has been repeated within the time period; and
generate at least one clock signal with the determined operating frequency, the clock signal being used for operation of the processor.

17. The device of claim 16, further comprising:
a plurality of sensors configured to register the plurality of temperature readings, the processor being configured to execute the computer-readable instructions to receive the plurality of temperature readings from the plurality of sensors.

18. The device of claim 17, wherein the processor is configured to execute the computer-readable instructions to determine the temperature value as one of a minimum of, a maximum of or an average of the plurality of temperature readings.

* * * * *